US012763537B2

(12) United States Patent
Arnault et al.

(10) Patent No.: US 12,763,537 B2
(45) Date of Patent: Oct. 13, 2026

(54) GROUNDING BRUSH ASSEMBLY

(71) Applicant: AKTIEBOLAGET SKF, Gothenburg (SE)

(72) Inventors: Benoit Arnault, Saint-Cyr-sur-Loire (FR); Emmanuel Benevise, Monts (FR); Thomas Perrotin, Saint Roch (FR); Anthony Simonin, Tours (FR)

(73) Assignee: AKTIEBOLAGET SKF, Gothenburg (SE)

( * ) Notice: Subject to any disclaimer, the term of this patent is extended or adjusted under 35 U.S.C. 154(b) by 102 days.

(21) Appl. No.: 18/440,105

(22) Filed: Feb. 13, 2024

(65) Prior Publication Data

US 2024/0283206 A1 Aug. 22, 2024

(30) Foreign Application Priority Data

Feb. 20, 2023 (FR) ...................................... 2301538

(51) Int. Cl.
*H01R 39/38* (2006.01)
*H02K 13/10* (2006.01)

(52) U.S. Cl.
CPC ........... *H01R 39/385* (2013.01); *H02K 13/10* (2013.01)

(58) Field of Classification Search
CPC ...... H01R 39/38; H01R 39/385; H01R 39/39; H01R 2201/10; H01R 39/24; H02K 13/10; H02K 7/003; H02K 11/40; H02K 5/14; F16C 19/04; F16C 41/002
See application file for complete search history.

(56) References Cited

U.S. PATENT DOCUMENTS

| | | | | |
|---|---|---|---|---|
| 7,528,513 | B2 | 5/2009 | Oh | |
| 2004/0233592 | A1 | 11/2004 | Oh et al. | |
| 2017/0353087 | A1* | 12/2017 | Magno Dos Santos . | H02K 5/16 |
| 2021/0021180 | A1 | 1/2021 | Hubert et al. | |

(Continued)

FOREIGN PATENT DOCUMENTS

| | | | | |
|---|---|---|---|---|
| CN | 213576191 U * | 6/2021 | ............... | H02K 5/15 |
| DE | 102021114965 A1 | 12/2022 | | |

(Continued)

OTHER PUBLICATIONS

English translation of CN-213576191-U (Year: 2021).*

(Continued)

*Primary Examiner* — Tulsidas C Patel
*Assistant Examiner* — Joshua Kiel M Rodriguez
(74) *Attorney, Agent, or Firm* — J-TEK LAW PLLC; Scott T. Wakeman; Mark A. Ussai

(57) ABSTRACT

A grounding brush assembly includes a brush and a brush mounting plate, the brush being provided with a plurality of conductive fibers and a support inside which the conductive fibers are housed, the mounting plate being secured to the support and provided with at least one radial portion extending radially outwardly with respect to the support. At least one centering portion extends at least axially from the radial portion and is spaced radially apart from and partially surrounding the support. Further, at least one orifice is formed in the centering portion, the orifice being spaced a distance apart from the proximal end of the centering portion and a distance apart from the distal end of the centering portion.

12 Claims, 10 Drawing Sheets

(56) References Cited

U.S. PATENT DOCUMENTS

| | | | |
|---|---|---|---|
| 2021/0293279 | A1 | 9/2021 | Hubert et al. |
| 2021/0364040 | A1 | 11/2021 | Arnault et al. |
| 2021/0364041 | A1 | 11/2021 | Berruet et al. |
| 2022/0294319 | A1 | 9/2022 | Arnault et al. |
| 2023/0013562 | A1* | 1/2023 | Schamin .............. H02K 5/1732 |
| 2024/0322508 | A1 | 9/2024 | Arnault et al. |
| 2024/0322509 | A1 | 9/2024 | Arnault et al. |

FOREIGN PATENT DOCUMENTS

| | | | | |
|---|---|---|---|---|
| DE | 102021207724 | A1 | 1/2023 | |
| FR | 3108452 | A1 | 9/2021 | |
| FR | 3120754 | A1 | 9/2022 | |
| GB | 2160370 | A * | 12/1985 | ............... H02K 5/15 |

OTHER PUBLICATIONS

Preliminary Search Report from the French Patent Office dated Sep. 4, 2023 in related French application No. FR2301508, including Search Report and Written Opinion.

* cited by examiner

GROUNDING BRUSH ASSEMBLY

CROSS-REFERENCE

This application claims priority to French patent application no. 2301538 filed on Feb. 20, 2023, the contents of which are fully incorporated herein by reference.

BACKGROUND OF THE INVENTION

The present invention relates to the field of grounding devices for controlling the shaft current generated in electric motors or machines, and in particular grounding brush assemblies.

In an electric motor or machine, at least one rolling bearing is mounted between a casing of the motor, or other electric machine, and a rotary shaft in order to support the shaft. In operation, when the shaft is rotating, an electrical potential difference can appear between the shaft and the casing of the electric motor or machine, which may generate an electric current between the inner ring of the rolling bearing, which is secured to the rotary shaft, and the outer ring secured to the casing.

The electric current passing through the components of the rolling bearing can damage these components, in particular the rolling elements and the raceways formed on the inner and outer rings. Electrical discharges can also generate vibrations.

To remedy these drawbacks, it is a known practice to "earth" or ground the rotary shaft by using a grounding brush or sliding contact comprising conductive fibers. The grounding brush is generally mounted in the bore of the casing of the electric motor such that the free ends of the fibers are in radial contact with the outer surface of the rotary shaft. Due to the conductivity of the fibers, the brush is maintained at the same electrical potential as the casing of the electric motor. The inner and outer rings of the rolling bearing are also at the same electrical potential, which reduces and preferably even eliminates, the problematic electrical discharges through the rolling bearing.

US Publication No. 2021/0021180A1 discloses a grounding brush assembly comprising a grounding brush, which is provided with a support and a plurality of conductive fibers mounted in this support, and an annular mounting plate provided with a plurality of tongues for radial and axial retention of the support of the grounding brush and an annular outer flange radially surrounding the brush and the tongues. The tongues are formed by plastic deformations of the mounting plate. Such a grounding brush assembly is force-fitted into the bore of the casing, such that the grounding brush assembly is difficult to dismantle.

SUMMARY OF THE INVENTION

The present invention is directed to a grounding brush assembly comprising a grounding brush and a brush mounting plate, the brush being provided with a plurality of conductive fibers and a support inside of which the conductive fibers are housed.

The mounting plate is secured to the support and is provided with at least one radial portion extending radially outwards with respect to the support, and at least one centering portion extending from the radial portion at least axially and radially at least partly surrounding the support by being spaced apart radially from the support, the centering portion being provided with a proximal end connected to the radial portion and a distal end, the proximal and distal ends delimiting the axial dimension of the centering portion.

According to a general feature of the invention, at least one orifice is formed on the centering portion of the mounting plate, the orifice remaining at a distance from the proximal and distal ends of the centering portion.

As used herein, the expression "orifice formed on the centering portion of the mounting plate" is intended to mean that the orifice extends exclusively on the centering portion of the mounting plate. In other words, the orifice does not extend both on the centering portion and on the radial portion of the mounting plate.

When the assembly is mounted radially, at least partly, between a casing and a shaft of an electric motor, the orifice allows the insertion of a tool to readily dismantle the assembly, the tool notably making it possible to axially pull on the mounting plate by exerting an effort on the side opposite the casing.

The orifice can be formed as a blind hole extending from an inner surface or from an outer surface of the centering portion of the mounting plate. Alternatively, the orifice may be formed as a through hole passing right through the thickness of the centering portion of the mounting plate.

The centering portion of the mounting plate can be annular. Alternatively, the centering portion of the mounting plate can be of corrugated form circumferentially, the orifice being formed in a zone of small diameter of the centering portion.

According to another variant, the mounting plate comprises a plurality of centering portions spaced apart from one another circumferentially. The centering portions are thereby formed as lugs.

The grounding brush assembly may comprise a bent-back portion extending radially inwardly from the distal end of the centering portion of the mounting plate.

The mounting plate can further comprise at least one reinforcing folded-down portion extending from the distal end of the centering portion of the mounting plate and coming to bear against the centering portion of the mounting plate to form a ply and locally obtain a double thickness of material.

Advantageously, the longitudinal dimension of the reinforcing folded-down portion is at least three times greater than the thickness of the reinforcing folded-down portion.

Preferably, the reinforcing folded-down portion remains at a distance from the orifice or is flush with the orifice. Alternatively, the reinforcing folded-down portion can cover a part of the orifice.

The invention relates also to an electric machine or motor comprising a casing, a shaft, and a grounding brush assembly as defined previously mounted radially at least partly between the casing and the shaft, the conductive fibers of the assembly being in contact with the shaft.

BRIEF DESCRIPTION OF THE SEVERAL VIEWS OF THE DRAWINGS

The present invention will be better understood on studying the detailed description of embodiments, taken as non-limiting examples and illustrated by the attached drawings in which.

DETAILED DESCRIPTION OF THE INVENTION

Figure 1:
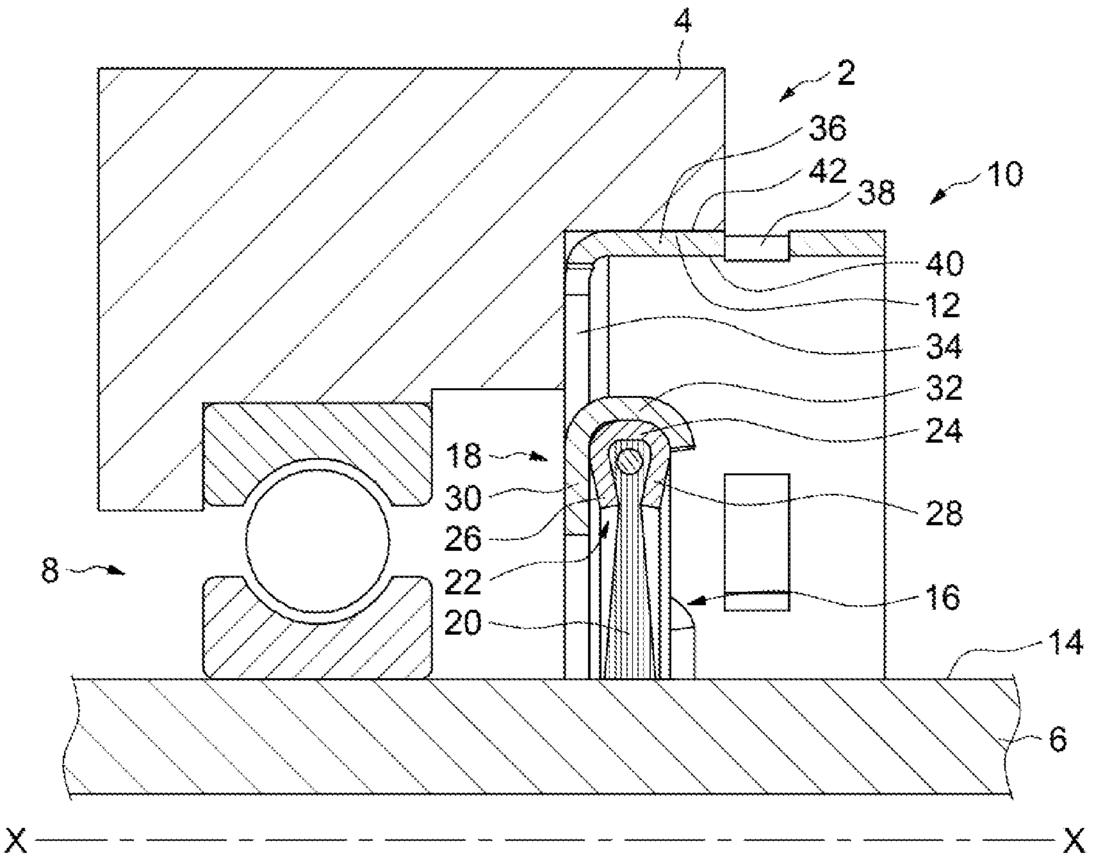
FIG. 1 is an axial cross-sectional view of a grounding brush assembly mounted partly radially between a rotary shaft and an electric motor casing according to a first exemplary embodiment of the invention.

FIG. 1 represents, in axial cross-section, a part of an electric motor or machine 2 comprising a fixed casing 4, a shaft 6 rotatable about an axis X-X, and a bearing 8 radially supporting the shaft 6. The bearing 8 may be formed, for example, as a rolling bearing, preferably as a ball bearing. Alternatively, the bearing 8 may include another appropriate type of rolling elements, such as cylindrical rollers, tapered rollers, needles, etc. As a further alternative, the bearing 8 may be formed as a plain bearing.

The motor or machine 2 further comprises a grounding brush assembly 10 mounted partly radially between a bore of the casing 12 and the outer cylindrical surface of the shaft 14. The assembly 10 is, for example, force-fitted into the bore of the casing 12.

Figure 2:
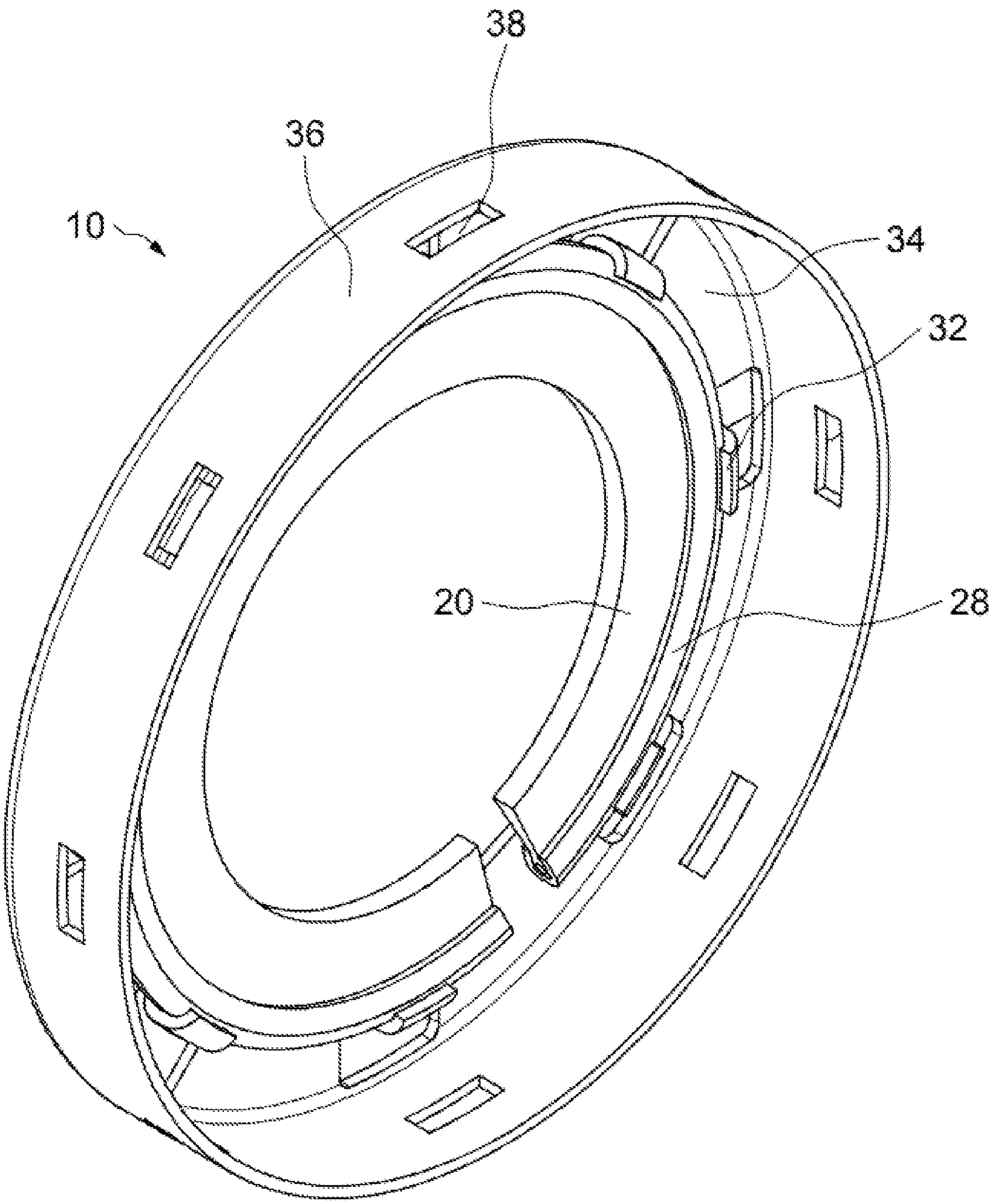
FIG. 2 is a perspective view of the grounding brush assembly of FIG. 1.
Figure 3:
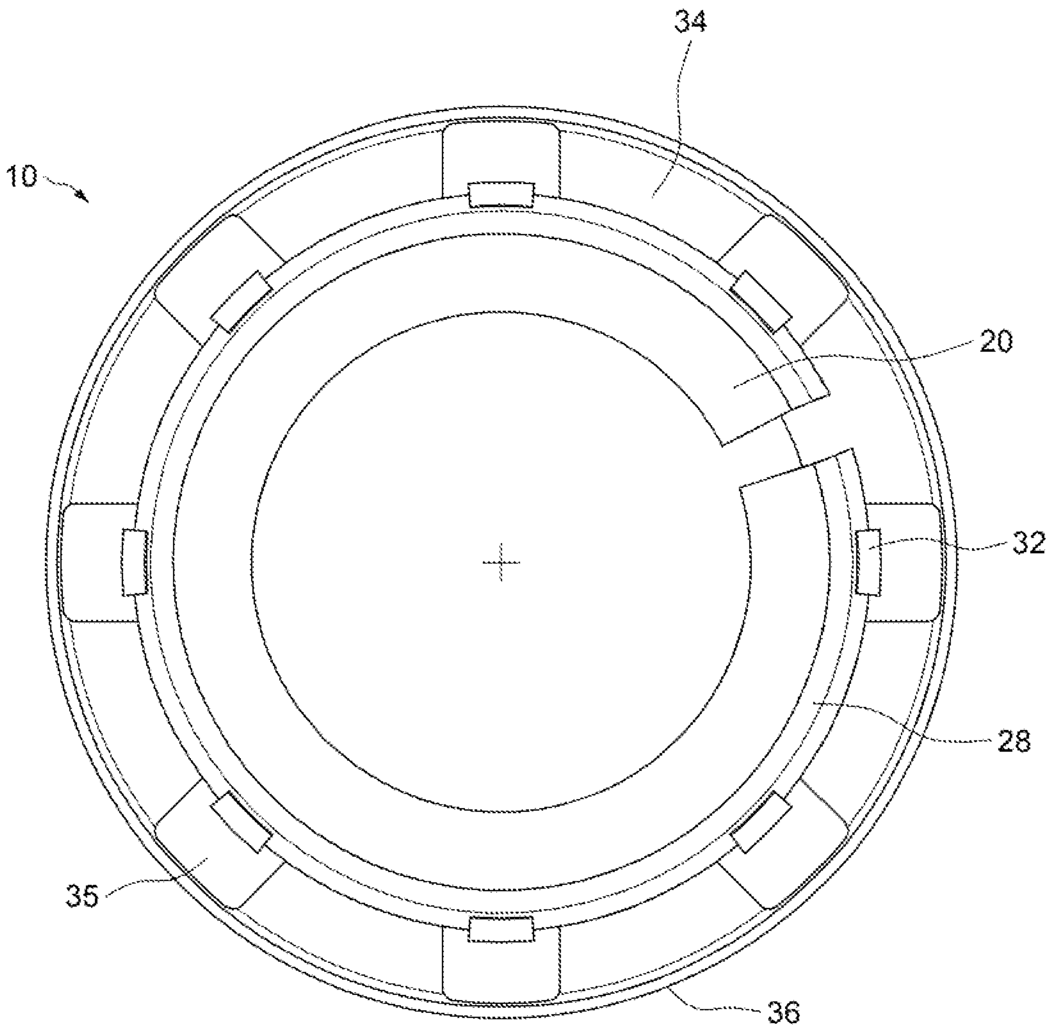
FIG. 3 is a front view of the grounding brush assembly of FIG. 1.

As better shown in FIGS. 2 and 3, the grounding brush assembly 10 has a generally annular form. The assembly 10 basically comprises a grounding brush 16 and a brush mounting plate 18.

The grounding brush 16 comprises a plurality of conductive fibers 20 and a support 22, the conductive fibers 20 being housed inside the support 22 of the brush 16. The conductive fibers 20 are formed, for example, of carbon, stainless steel, conductive plastics, such as acrylic fibers or nylon, etc. The plurality of conductive fibers 20 are preferably formed as an open ring. In the illustrated example, the conductive fibers 20 are folded around a link wire (not indicated). The free distal end of each one of the conductive fibers 20 is in radial contact with the outer surface of the shaft 14.

To ensure the mounting and the retaining of the conductive fibers 20, the support 22 of the brush 16 includes a mounting portion 24, a first lateral rim 26 extending from one axial side of the mounting portion 24 and a second lateral rim 28 extending from an opposing axial side of the mounting portion 24.

The mounting plate 18 is secured to the support 22 of the brush 16. The mounting plate 18 includes a main body 30 bearing axially against the first lateral rim 26 of the support 22 of the brush 16, a plurality of tongues 32 configured for axial and radial retention of the brush 16, and an annular radial portion 34. The radial portion 34 is provided with a plurality of through-apertures 35 formed in the thickness of the radial portion 34 and spaced circumferentially apart from each other. Preferably, the apertures 35 are formed when partially cutting the radial portion 34 to form the retaining tongues 32.

The radial portion 34 of the mounting plate 18 extends radially outwardly from the main body 30 of the mounting plate 18. The retaining tongues 32 extend from the main body 30 of the mounting plate 18 and are spaced circumferentially apart from each other in the assembly 10. Each retaining tongue 32 extends from the main body 30 of the mounting plate 18 such that the retaining tongue 32 locally radially surrounds the support 22 of the brush 16 by being in radial and axial contact with the support 22. The support 22 of the brush 16 is thus held axially and radially by the retaining tongues 32.

In the depicted example, the mounting plate 18 includes eight retaining tongues 32 spaced circumferentially apart regularly or evenly. Alternatively, the mounting plate 18 may include a different number of retaining tongues 32 and/or have retaining tongues 32 that are spaced apart irregularly or unevenly.

The mounting portion 24 of the support 22 is in radial contact against the retaining tongues 32 and the second lateral rim 28 is in axial contact against the retaining tongues 32. The mounting portion 24 extends to the large or outer diameter edge of the first lateral rim 26. The mounting portion 24 here extends substantially or entirely axially, but the mounting portion 24 may alternatively extend obliquely.

The second lateral rim 28 of the support 22 extends radially inwardly from the mounting portion 24. The second lateral rim 28 extends from the mounting portion 24 on the side or axial end opposite to the first lateral rim 26. The mounting portion 24 and the first and second lateral rims 26, 28 are of annular form and delimit a channel that is radially open on the internal side, an end of each conductive fiber 20 being located within the channel. The first and second lateral rims 26, 28 axially grip the conductive fibers 20 such that the conductive fibers 20 bear axially on either side against the first and second lateral rims 26, 28.

In the depicted exemplary embodiment, the conductive fibers 20 bear radially against the mounting portion 24 and the first and second lateral rims 26, 28 extend obliquely inwardly from the mounting portion 24 and generally toward each other. In a variant, the first and second lateral rims 26, 28 may extend entirely or substantially radially.

As depicted, the mounting plate 18 and the support 22 of the brush 16 are two distinct or initially separate parts. In a variant, the mounting plate 18 may be formed as single piece with the support 22 of the brush 16, for example, produced by cutting and stamping. In this case, the main body 30 of the mounting plate 18 extends from the small or inner diameter edge of the first lateral rim 26.

The mounting plate 18 and the grounding brush 16 comprise an electrically conductive material, such as, for example, aluminum, stainless steel, bronze, copper or other material.

The mounting plate 18 also comprises an annular centering portion 36 extending at least axially from the large or outer diameter edge of the radial portion 34 of the mounting plate 18. The centering portion 36 of the mounting plate 18 radially surrounds and is spaced radially apart from the mounting portion 24 of the support 22. As depicted, the centering portion 36 of the mounting plate 18 extends entirely axially, but may alternatively extend both axially and radially, i.e. obliquely, inwardly or outwardly.

Instead of an annular centering portion 36, the mounting plate 18 may alternatively comprise a plurality of centering portions 36 spaced circumferentially apart from each other. The plurality of centering portions 36 of the mounting plate 18 may extend entirely axially or may extend obliquely inwardly or obliquely outwardly.

The assembly 10 further comprises a plurality of orifices 38 formed on the centering portion 36 of the mounting plate 18. Preferably, the orifices 38 are at least substantially identical to each other and are spaced circumferentially apart from each other. Each orifice 38 is axially at a distance from the radial portion 34 and from the distal free end of the centering portion 36 of the mounting plate 18, i.e., each orifice 38 is spaced an axial distance from both the radial portion 34 and from the free end of the centering portion 36. The proximal end of the centering portion 36 of the mounting plate 18 connects to the radial portion 34 of the mounting plate 18. The centering portion 36 of the mounting plate 18 is delimited axially by a proximal end and by an opposite free, distal end.

Each orifice 38 may be formed as a through hole extending entirely through the thickness of the centering portion 36 of the mounting plate 18. In other words, each orifice 38 emerges on an inner surface 40 of the centering portion 36 of the mounting plate 18 and on an outer surface 42 thereof.

In the depicted example, the mounting plate 18 comprises eight orifices 38 spaced apart circumferentially regularly or evenly. Also, the orifices 38 are shown arranged on a same circle. Alternatively, the mounting plate 18 may comprises a different number of orifices 38 and/or of orifices 38 that are spaced apart irregularly (i.e., staggered) and/or the orifices 38 may be located at different axial positions on the centering portion 36 of the mounting plate 18, or the mounting plate 18 may even include only a single orifice 38.

In another variant, one or more of the orifices 38 may each be formed as a blind hole extending outwardly from the inner surface 40 or inwardly from the outer surface 42 of the centering portion 36 of the mounting plate 18 and having a closed interior end located between the surfaces 40, 42.

Referring again to FIG. 1, the assembly 10 is mounted radially at least partly between the bore of the casing 12 and the outer surface of the shaft 14, such that the radial portion 34 of the mounting plate 18 bears axially against a shoulder of the casing 4. The radial portion 34 of the mounting plate 18 bears radially against the bore of the casing 12 and extends protruding radially inwardly with respect to the casing 12. Further, the centering portion 36 of the mounting plate 18 bears radially against and the bore of the casing 12 and extends axially with respect to the casing 4.

As depicted, the centering portion 36 of the mounting plate 18 extends axially outside of the casing 4, the orifices 38 being formed on the centering portion 36 of the mounting plate 18 so as to be axially offset outwardly with respect to the casing 4, i.e., the orifices 38 are spaced axially from the casing 4. In a variant, only a part of each orifice 38 could extend axially outside of the casing 4, such that the orifices 38 extend axially across an axial end of the casing 4.

The orifices 38 of the mounting plate 18 enable the insertion of a tool (not represented) making it possible to dismantle the assembly 10 relatively easily or readily. That is, the tool makes it possible to pull axially on the mounting plate 18 by exerting a force on the side opposite to the casing 4.

In the depicted example, the orifices 38 are of rectangular form. Alternatively, the orifices 38 may have any other shape that enables the insertion of the tool.

Figure 4:
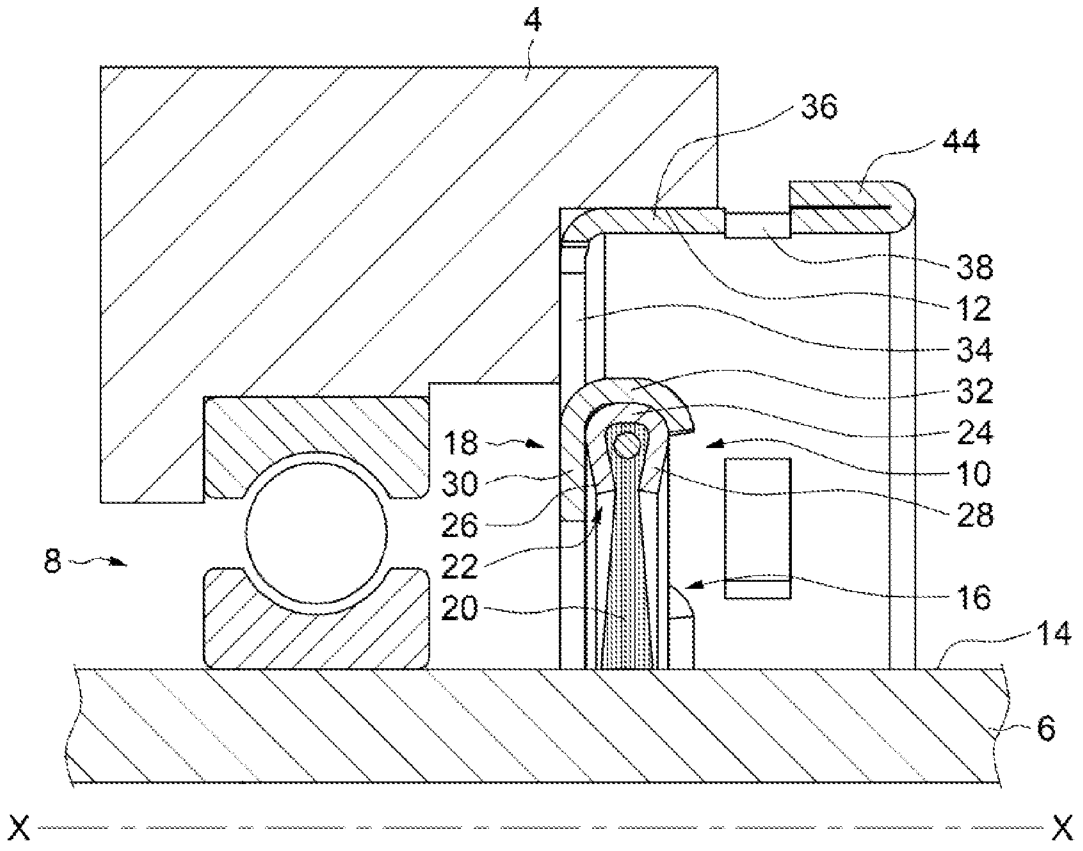
FIG. 4 is an axial cross-sectional view of a grounding brush assembly mounted radially at least partly between a rotary shaft and an electric motor casing according to a second exemplary embodiment of the invention.

The exemplary embodiment illustrated in FIG. 4, in which elements that are identical bear the same references, differs from the example depicted in FIGS. 1 to 3 in that the mounting plate 18 of the assembly 10 further comprises an annular reinforcing folded-down portion 44. The folded-down portion 44 extends from the distal end of the centering portion 36 of the mounting plate 18 and comes to bear against an outer side of the centering portion 36 so as to form a ply and locally provide a double thickness of material. In this exemplary embodiment, the distal end of the centering portion 36 is not therefore free or unconnected with another part or portion.

Alternatively, the reinforcing folded-down portion 44 may be folded down to come to bear on the inner side of the centering portion 36. In another variant, the mounting plate 18 may include a plurality of reinforcing folded-down portions 44 spaced circumferentially apart from each other.

In the depicted example, the free end of the reinforcing folded-down portion 44 of the mounting plate 18 is flush with the orifices 38. In a variant, the free end of the reinforcing folded-down portion 44 of the mounting plate 18 may be spaced a distance from the orifices 38.

Preferably, the longitudinal dimension or length of the reinforcing folded-down portion 44 is at least three times greater than its thickness, notably in order to increase the mechanical strength of the mounting plate 18 of the assembly 10.

Figure 5:
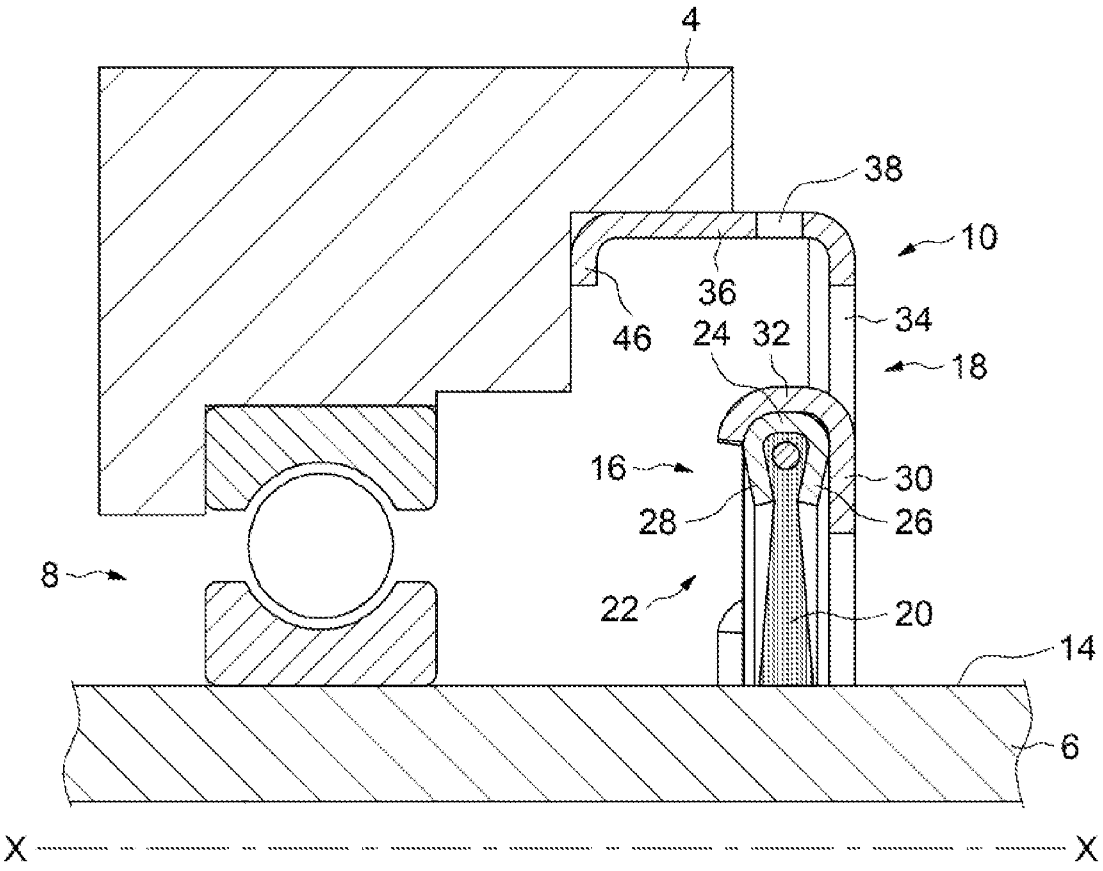
FIG. 5 is an axial cross-sectional view of a grounding brush assembly mounted radially at least partly between a rotary shaft and an electric motor casing according to a third exemplary embodiment of the invention.
Figure 6:
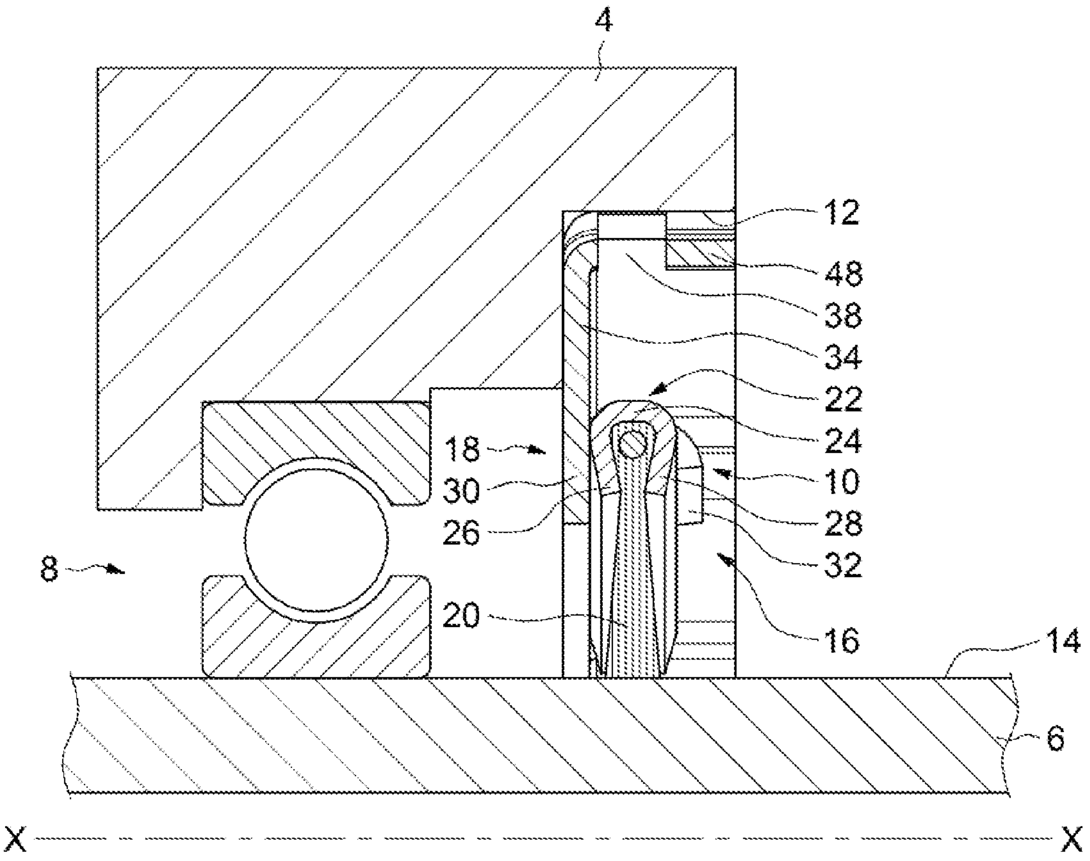
FIG. 6 is an axial cross-sectional view of a grounding brush assembly mounted radially between a rotary shaft and an electric motor casing according to a fourth exemplary embodiment of the invention.
Figure 7:
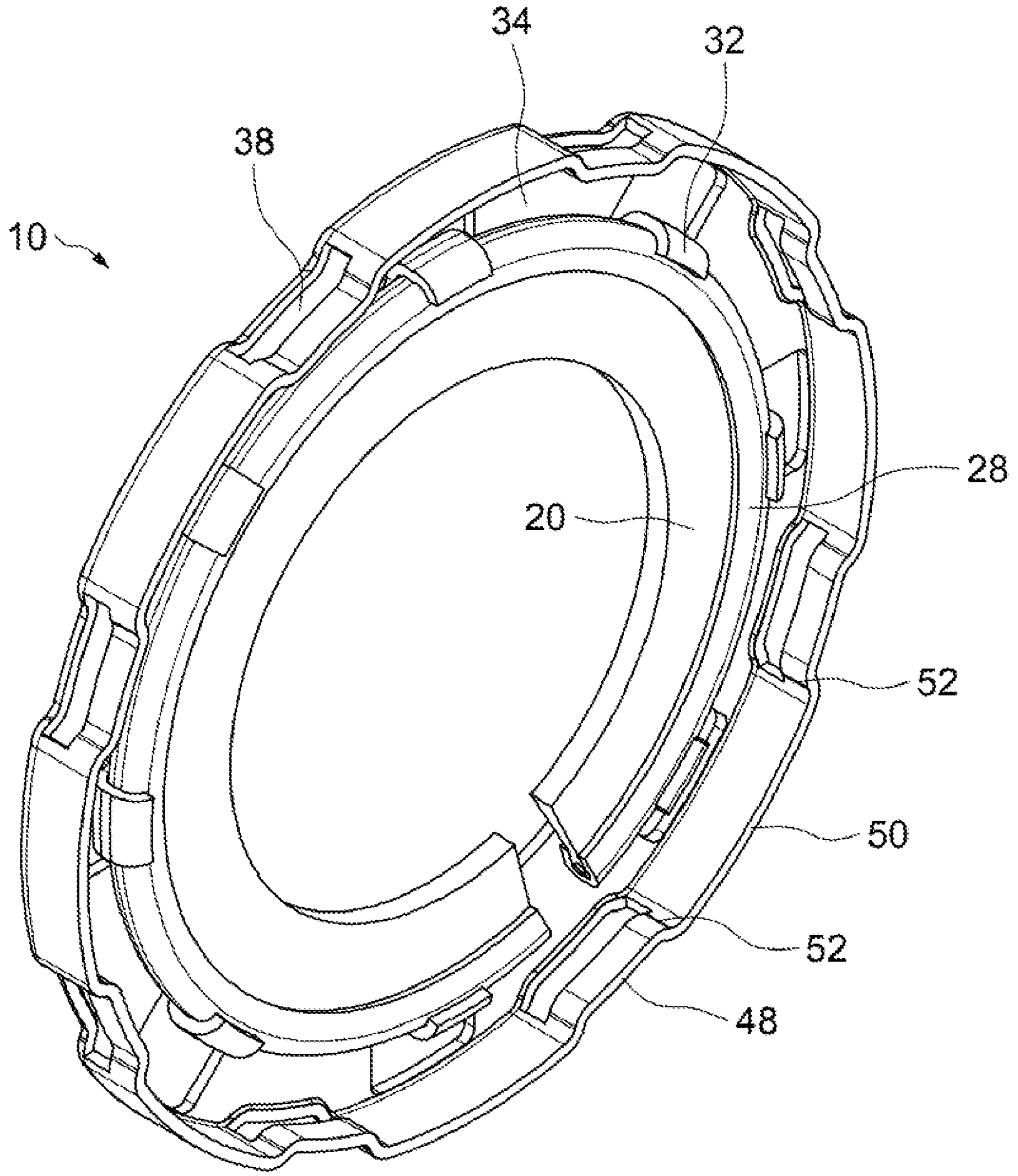
FIG. 7 is a perspective view of the grounding brush assembly of FIG. 6.
Figure 8:
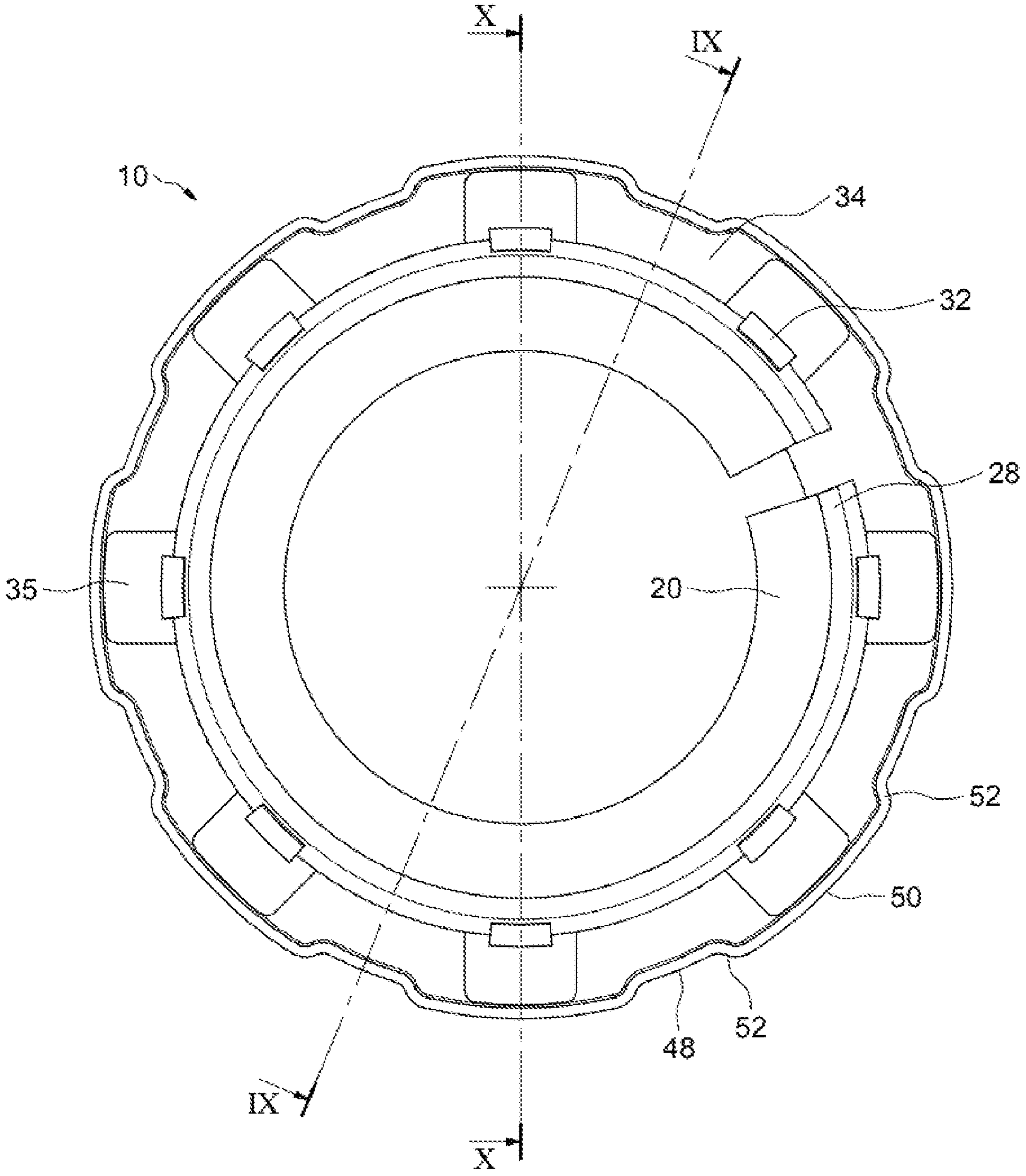
FIG. 8 is a front view of the grounding brush assembly of FIG. 6.
Figure 9:
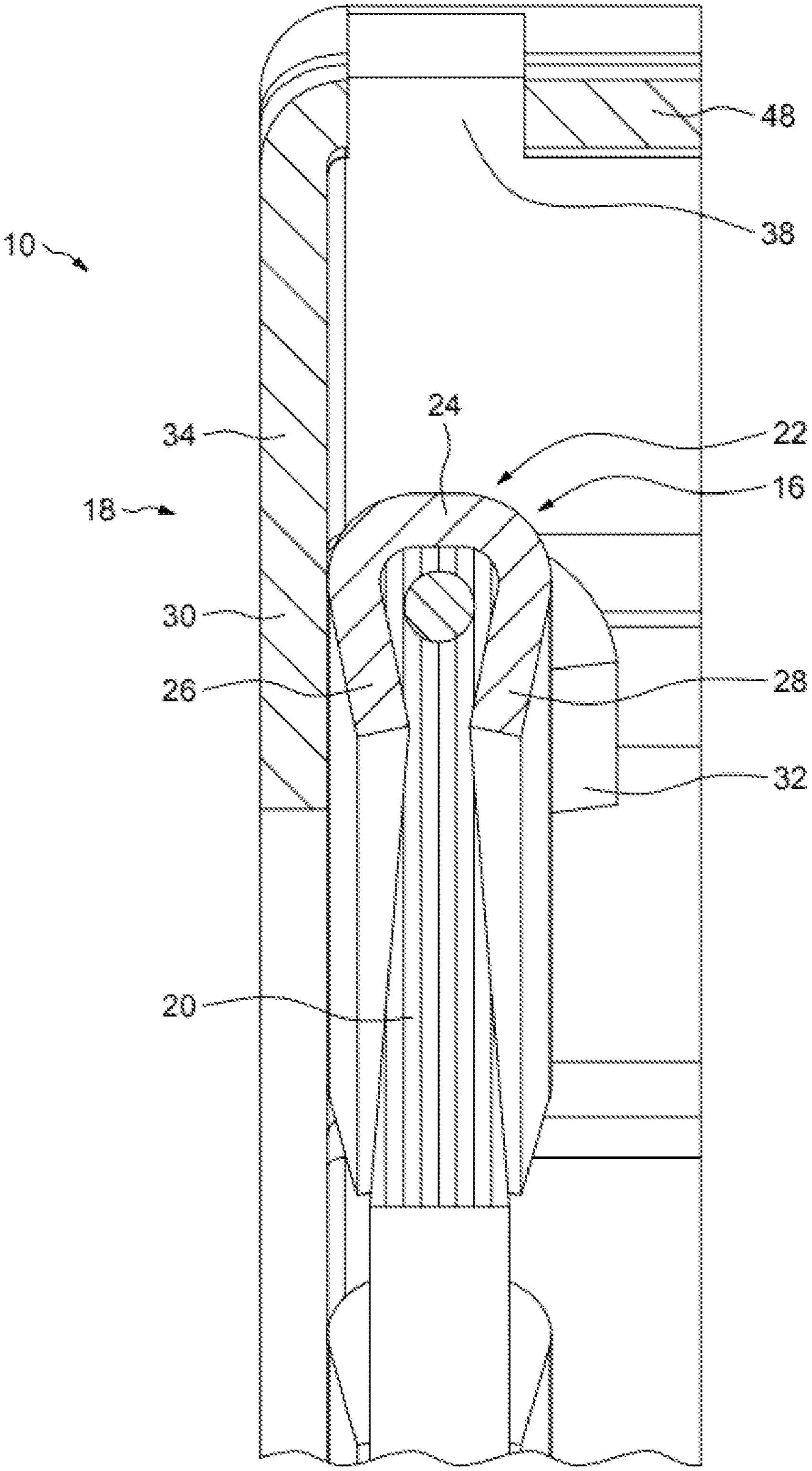
FIG. 9 is a cross-sectional view of the assembly of FIG. 6 along the axis IX-IX.
Figure 10:
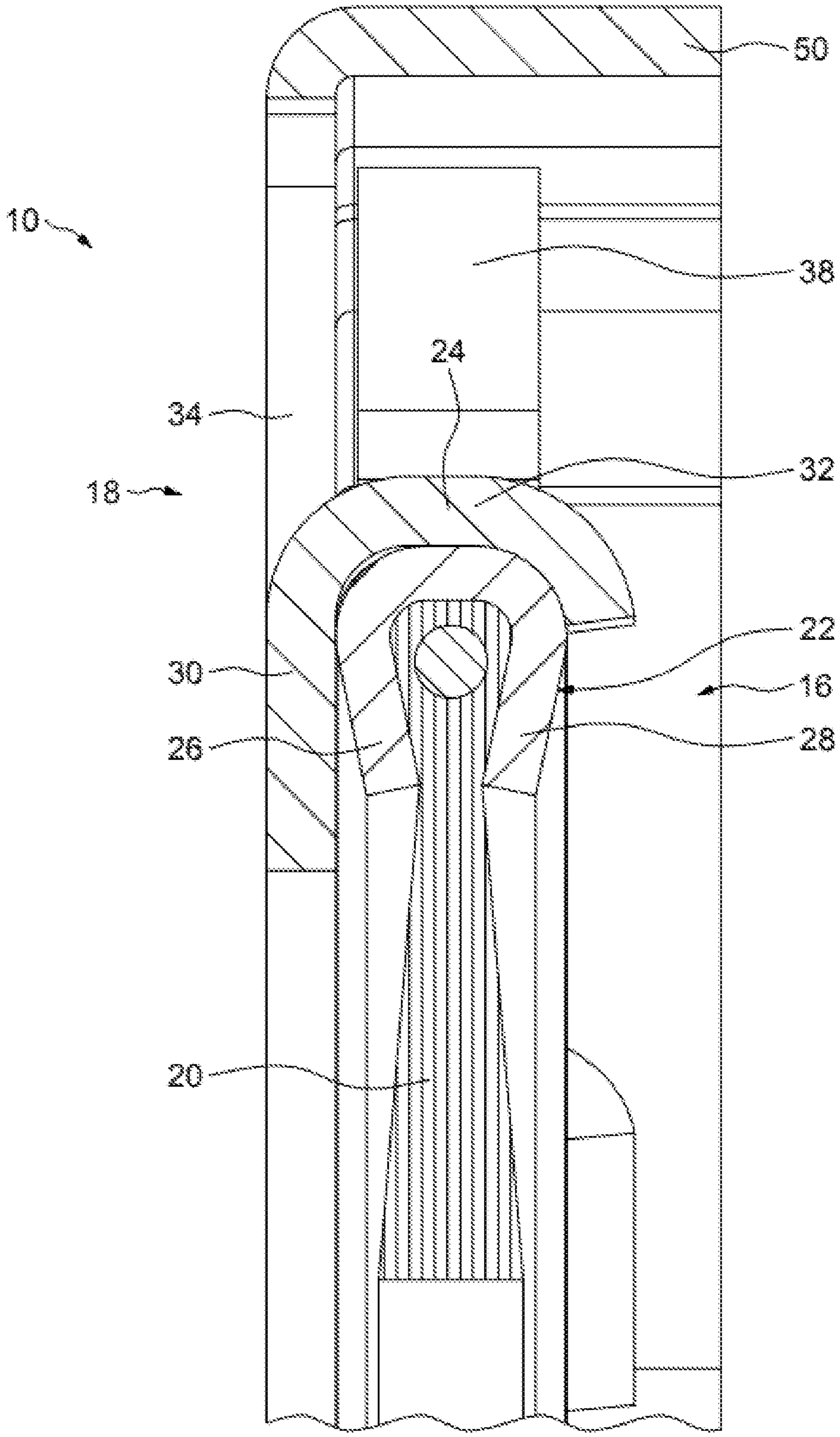
FIG. 10 is a cross-sectional view of the assembly of FIG. 6 along the axis X-X.

The exemplary embodiment illustrated in FIG. 5, in which the elements that are identical bear the same references, differs from the first example illustrated in that the mounting plate 18 of the assembly 10 comprises at least one bent-back portion 46 extending radially inwardly from the distal end of the centering portion 36 of the mounting plate 18. In this exemplary embodiment, the distal end of the centering portion 36 is not therefore free or unconnected with another portion of the assembly 10.

The assembly 10 is mounted radially partly between the bore of the casing 12 and the outer surface of the shaft 14 such that the bent-back portion 46 of the mounting plate 18 bears axially against a shoulder of the casing 4 or against an outer ring of the bearing 8, in particular when the shaft 6 is rotary. The bent-back portion 46 of the mounting plate 18 is radially bearing against the bore of the casing 12. The bent-back portion 46 of the mounting plate 18 extends axially protruding outwards with respect to the casing 4.

The assembly 10 is mounted radially partly between the bore of the casing 12 and the outer surface of the shaft 14 such that the centering portion 36 of the mounting plate 18 bears radially against the bore of the casing 12. The centering portion 36 of the mounting plate 18 and the bent-back portion 46 of the mounting plate 18 extend radially protruding inwardly with respect to the casing 4.

The assembly 10 is mounted radially partly between the bore of the casing 12 and the outer surface of the shaft 14 such that the radial portion 34 of the mounting plate 18 is offset axially outside of the casing 4. The plurality of orifices 38 are formed on the centering portion 36 of the mounting plate 18 such that each orifice 38 is offset axially from the casing 4, each orifice 38 extending axially, at least partly, outside of the casing 4.

The exemplary embodiment illustrated in FIGS. 6 to 10, in which the elements that are identical bear the same references, differs from the first example in that the centering portion 36 of the mounting plate 18 is of a circumferentially corrugated form in the assembly 10.

More specifically, the centering portion 36 of the mounting plate 18 comprises alternating small diameter sections 48 and large diameter sections 50 connected to each other by connecting sections 52. That is, each one of the small diameter sections 48 and each one of the large diameter sections 50 of the centering portion 36 is extended on either circumferential side by a connecting section 52.

In the depicted example, the connecting sections 52 are oblique. In a variant, the connecting sections 52 of the centering portion 36 of the mounting plate 18 can extend purely or substantially entirely radially.

The assembly 10 comprises a plurality of orifices 38 formed in a zone of the small diameter sections 28 of the centering portion 36 of the mounting plate 18. Specifically, each orifice 38 is formed on one of the small diameter sections 48 of the centering portion 36 of the mounting plate 18 and extends partly over both of the two connecting sections 52 directly circumferentially adjacent to the particular small diameter section 48. In a variant, each orifice 38 may be formed only or entirely on a small diameter section 48 of the centering portion 36 of the mounting plate 18.

In the depicted example, the mounting plate 18 comprises eight identical orifices 38 spaced apart regularly circumferentially in the assembly 10. The orifices 38 are preferably arranged on a same circle. In a variant, the mounting plate 18 comprises a different number of orifices 38 and/or orifices 38 spaced apart irregularly and/or orifices 38 formed at different axial positions of zones of a small diameter section 48 of the centering portion 36 of the mounting plate 18, or even include only a single orifice 38.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. A grounding brush assembly mountable between a casing having a bore and a shaft disposed within the bore, the grounding brush assembly comprising:

- a grounding brush including a support and a plurality of conductive fibers housed within the support; and
- a brush mounting plate secured to the support and including at least one radial portion extending radially outwardly with respect to the support and at least one centering portion extending axially from the radial portion and being spaced apart radially from and at least partly surrounding the support, the centering portion bearing radially against the bore of the casing and having a proximal end connected to the radial portion and a distal end, the proximal and distal ends delimiting an axial dimension of the centering portion and the centering portion being sized to extend axially outside of the casing, and at least one orifice formed in the centering portion and spaced a distance apart from the proximal end and a distance apart from the distal end, being axially offset outwardly with respect to the casing and configured to enable insertion of a tool for dismantling the assembly from the bore of the casing.

2. The assembly according to claim 1, wherein the centering portion of the mounting plate has an inner surface and an outer surface and the at least one orifice is formed as a blind hole extending from the inner surface or from the outer surface.

3. The assembly according to claim 1, wherein the at least one orifice is formed as a through hole extending through a thickness of the centering portion of the mounting plate.

4. The assembly according to claim 1, wherein the centering portion of the mounting plate is annular.

5. The assembly according to claim 1, wherein the centering portion of the mounting plate is of circumferentially corrugated form, the at least one orifice being formed in a zone of a small diameter section of the corrugated centering portion.

6. The assembly according to claim 5, wherein the corrugated centering portion includes a plurality of the small diameter sections alternating with a plurality of large diameter sections, each small diameter section being located between and connected with each one of two large diameter sections by a separate one of two connecting sections.

7. The assembly according to claim 1, wherein the mounting plate includes a plurality of centering portions circumferentially spaced apart from each other.

8. The assembly according to claim 1, further comprising a bent-back portion extending radially inwardly from the distal end of the centering portion of the mounting plate.

9. The assembly according to claim 1, wherein the mounting plate further includes at least one reinforcing folded-down portion extending from the distal end of the centering portion of the mounting plate and bearing against the centering portion so as to form a ply and locally providing a double thickness of material.

10. The assembly according to claim 9, wherein the longitudinal dimension of the reinforcing folded-down portion has a thickness and a longitudinal dimension at least three times greater than the thickness.

11. An electric motor comprising:

- a casing;
- a shaft; and
- a grounding brush assembly according to claim 1, the grounding brush assembly being mounted at least partly radially between the casing and the shaft, the conductive fibers of the assembly being in contact with the shaft.

12. A grounding brush assembly mountable between a casing having a bore and a shaft disposed within the bore, the grounding brush assembly comprising:

- a grounding brush including a support and a plurality of conductive fibers housed within the support; and
- a brush mounting plate secured to the support and including at least one radial portion extending radially outwardly with respect to the support and at least one centering portion extending axially from the radial portion and being spaced apart radially from and at least partly surrounding the support, the centering portion having a proximal end connected to the radial portion and a distal end, the proximal and distal ends delimiting an axial dimension of the centering portion, the centering portion including alternating small diameter sections and large diameter sections connected by connecting sections, the large diameter sections being disposable against the bore of the casing and the small diameter sections being spaced axially inwardly from the bore, and at least one orifice formed in at least one of the small diameter sections of the centering portion and spaced a distance apart from the proximal end and a distance apart from the distal end and configured to enable insertion of a tool for dismantling the assembly from the bore of the casing.

* * * * *